United States Patent
Hou

(10) Patent No.: US 9,442,606 B2
(45) Date of Patent: Sep. 13, 2016

(54) IMAGE BASED TOUCH APPARATUS AND CONTROL METHOD THEREOF

(71) Applicant: Wistron Corporation, New Taipei (TW)

(72) Inventor: Chia-Chang Hou, New Taipei (TW)

(73) Assignee: Wistron Corporation, New Taipei (TW)

( * ) Notice: Subject to any disclaimer, the term of this patent is extended or adjusted under 35 U.S.C. 154(b) by 92 days.

(21) Appl. No.: 14/272,508

(22) Filed: May 8, 2014

(65) Prior Publication Data

US 2015/0199071 A1    Jul. 16, 2015

(30) Foreign Application Priority Data

Jan. 15, 2014   (TW) .............................. 103101471 A

(51) Int. Cl.
*G06F 3/042* (2006.01)
*G06F 3/041* (2006.01)

(52) U.S. Cl.
CPC .......... *G06F 3/0425* (2013.01); *G06F 3/0416* (2013.01); *G06F 3/0418* (2013.01)

(58) Field of Classification Search
CPC ........ G06F 3/041; G06F 3/042; G06F 3/045; G06F 3/0421; G06F 3/0416; G06F 3/0428
USPC ..................... 345/173–175; 178/18.01–18.06
See application file for complete search history.

(56) References Cited

U.S. PATENT DOCUMENTS

| 7,692,625 B2 * | 4/2010 | Morrison | G06F 3/0428 345/156 |
| 2010/0171710 A1* | 7/2010 | Zhao | G06F 3/0421 345/173 |
| 2011/0199338 A1* | 8/2011 | Kim | G06F 3/0418 345/175 |
| 2013/0257736 A1 | 10/2013 | Hou et al. | |
| 2013/0257809 A1* | 10/2013 | Wei | G06F 3/0428 345/175 |

FOREIGN PATENT DOCUMENTS

CN    103365410    10/2013

OTHER PUBLICATIONS

"Office Action of Taiwan Counterpart Application", issued on May 14, 2015, with English translation thereof, p. 1-p. 8.

* cited by examiner

*Primary Examiner* — Amare Mengistu
*Assistant Examiner* — Stacy Khoo
(74) *Attorney, Agent, or Firm* — Jianq Chyun IP Office

(57) ABSTRACT

An image based touch apparatus and its control method are provided. The image based touch apparatus includes at least two region indicators, at least one image capturing apparatus, and a processing apparatus. Each region indicator includes indication units for indicating a touch surface and a touch sensor. The image capturing apparatus captures at least one image including the indication units. The processing apparatus is connected to the image capturing apparatus and configured for receiving the image. In the method, the touch surface is identified by the processing apparatus according to the indication units in the image. If a touch sensor detects an operating object touches the touch surface, the indication units of the region indicators generates a touch message. The processing apparatus determines the touch message according to the image and then determines a position of the operating object on the touch surface according to the image.

10 Claims, 4 Drawing Sheets

IMAGE BASED TOUCH APPARATUS AND CONTROL METHOD THEREOF

CROSS-REFERENCE TO RELATED APPLICATION

This application claims the priority benefit of Taiwan application serial no. 103101471, filed on Jan. 15, 2014. The entirety of the above-mentioned patent application is hereby incorporated by reference herein and made a part of this specification.

BACKGROUND OF THE INVENTION

1. Field of the Invention

The invention relates to an image based touch apparatus, and particularly relates to an image based touch apparatus using region indicators to mark a touch surface and a control method thereof.

2. Description of Related Art

With the rapid advancement of touch technology, the touch apparatus has become an essential apparatus in electronic devices, such as mobile phones, tablet personal computers, or portable multimedia players. The touch apparatus also replaces the traditional keyboard or physical buttons and has become a new-generation input apparatus. The common touch apparatus on the electronic devices includes a capacitive touch apparatus, a resistive touch apparatus, an optical touch apparatus, and so on.

According to the existing touch techniques, the touch apparatuses which have been designed, modified, manufactured, or set up to be touched by the operating object, such as smart phones or fixed-size touch screens on tablet personal computers, have been developed. However, the existing touch techniques cannot allow users to use the touch apparatuses at all times. For example, if the users are in the environment having only one blank wall, televisions with touch functions must be additionally installed, or projectors and projection screens capable of performing the touch functions need be installed before the touch functions are actually performed. Besides, the touch region of the touch apparatus is restricted by the size of the screen on the television, the projection range of the projector, and the size of the projection screen. Therefore, the application ranges of touch techniques can be expanded if apparatuses capable of adjusting the size of the touch regions can be developed.

SUMMARY OF THE INVENTION

Accordingly, the invention is directed to an image based touch apparatus and a control method thereof that allow users to adjust a range of a touch region in a short time, so that the users are able to perform touch functions with ease.

The invention is directed to an image based touch apparatus including at least two region indicators, at least one image capturing apparatus, and a processing apparatus. Each region indicator includes at least one indication unit and a touch sensor, wherein the indication units are configured to mark a touch surface. The image capturing apparatus captures at least one image including the region indicators. The processing apparatus is connected to the image capturing apparatus and is used to receive the at least one image, wherein the processing apparatus identifies the touch surface according to the indication units in the at least one image, and the indication units of the region indicators generate a touch message when the touch sensor detects that an operating object touches the touch surface. The processing apparatus analyzes the touch message according to the at least one image and determines a position of the operating object on touch surface according to the at least one image.

According to an embodiment of the invention, the touch surface is a quadrangle; the processing apparatus selects one set of two corresponding sides of the quadrangle in the identified touch surface and adjusts the two sides to be parallel to each other, and the adjusted quadrangle forms a calibration surface as the touch surface.

According to an embodiment of the invention, the touch sensor determines whether the operating object truncates signals spread over the touch surface.

According to an embodiment of the invention, each of the region indicators includes three indication units. These three indication units form a right-angled triangle. Extensions of two line segments which constitute the right angle of the triangle and extensions of two line segments which constitute a right angle of a triangle in another region indicator together surround and define the touch surface.

According to an embodiment of the invention, if the touch sensor does not detect that the operating object touches the touch surface, the indication units of the region indicators generate a non-touch message, and the processing apparatus analyzes the non-touch message according to the at least one image and stops determining the position of the operating object on the touch surface according to the at least one image.

From another point of view, the invention is directed to a control method of an image based touch apparatus, and the control method includes following steps: capturing at least one image including at least two region indicators, wherein the two region indicators are configured to mark a touch surface; receiving the at least one image and identifying the touch surface according to the region indicators in the at least one image; generating the touch message by the region indicators when the region indicators detect that an operating object touches the touch surface; analyzing the touch message according to the at least one image and determining a position of the operating object on the touch surface according to the at least one image.

According to an embodiment of the invention, the touch surface is a quadrangle, and the step of identifying the touch surface according to the region indicators in the at least one image includes: selecting two corresponding sides of the quadrangle and adjusting the two sides to be parallel to each other; forming a calibration surface as the touch surface by the adjusted quadrangle.

According to an embodiment of the invention, when the region indicators detect that the operating object touches the touch surface, the step of generating the touch message by the region indicators includes: determining whether the operating object truncates signals spread over the touch surface.

According to an embodiment of the invention, each region indicator includes three indication units, and these three indication units form a right-angled triangle, wherein the step of identifying the touch surface according to the region indicators in the at least one image includes: identifying extensions of two line segments which constitute the right angle of the triangle and extensions of two line segments which constitute the right angle of a triangle in another region indicator to surround and define the touch surface.

According to an embodiment of the invention, after the steps of analyzing the touch message according to the at least one image and identifying the position of the operating object on the touch surface, the control method further includes: generating a non-touch message by the region indicators if it is not detected that the operating object touches the touch surface; analyzing the non-touch message according to the at least one image and stopping determining the position of the operating object on the touch surface according to the at least one image.

In light of the foregoing descriptions, the region indicators of the invention may serve to set up the touch surface, and the size and the location of the touch surface may be identified by the images captured by the image capturing apparatus. When a user touches the touch surface with the operating object, the touch message is generated by the indication units of the region indicators, so as to notify the processing apparatus to identify the position of the operating object on the touch surface according to the image. Thereby, the user is able to quickly adjust the size of the touch region as needed and is allowed to perform touch functions under various circumstances.

To make the above features and advantages of the invention more comprehensible, several embodiments accompanied with drawings are described in detail as follows.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF EMBODIMENTS

Figure 1:
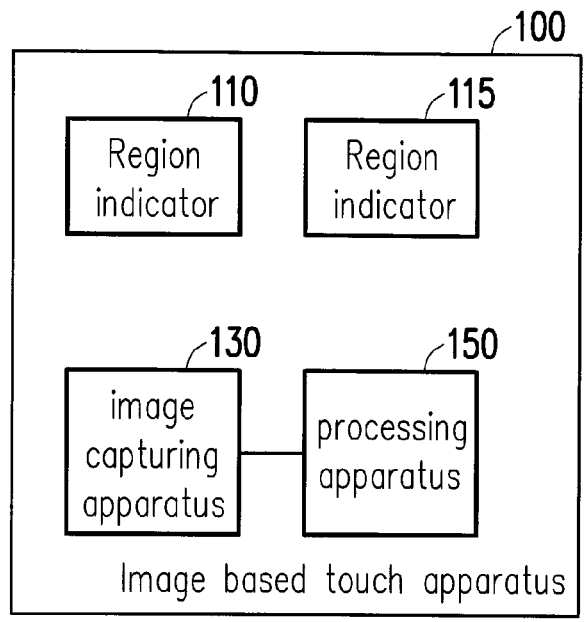
FIG. 1 is a block diagram illustrating an image based touch apparatus according to an embodiment of the invention.

Reference will now be made in detail to the present embodiments of the invention, examples of which are illustrated in the accompanying drawings. Wherever possible, the same reference numbers are used in the drawings and the description to refer to the same or like parts.

In order to adjust the touch region in a rapid way, an embodiment of the invention provides an image based touch apparatus and a control method thereof. The region indicator of the touch apparatus includes the indication unit and the touch sensor which is used to mark a touch surface. The processing apparatus identifies the touch surface according to the images captured by the image capturing apparatus. When the touch sensor detects the operating object, the processing apparatus analyzes the image to identify the position of the operating object on the touch surface, so that the user can quickly adjust the size of the touch region as needed and is allowed to perform touch functions with ease.

FIG. 1 is a block diagram illustrating an image based touch apparatus 100 according to an embodiment of the invention. As shown in FIG. 1, the image based touch apparatus 100 includes region indicators 110 and 115, an image capturing apparatus 130, and a processing apparatus 150.

In the present embodiment, the image based touch apparatus 100 utilizes the image based touch technique (also referred to as the image identification based touch technique). Generally, the size of the touch regions in the capacitive touch apparatus, the resistive touch apparatus, or the optical touch apparatus is often fixed, so that the user conduct relative operations on the fixed touch region. However, the touch techniques require the physical touch surface of the touch apparatus for determining the position of the operating object. The image based touch technique applied in the present embodiment not only overcomes the limitations of the physical touch surface but also is capable of projecting the touch region to a plane or any other touch surface not belonging to the touch apparatus itself, given that a projector is applied, so as to identify images captured by the image capturing apparatus via the image identification technique and determine the position of the operating object. The image based touch apparatus described in an embodiment of the invention provides the region indicators to adjust the desired range of the touch surface in a quick way, such that the user is allowed to perform the touch functions under various circumstances.

Figure 3:
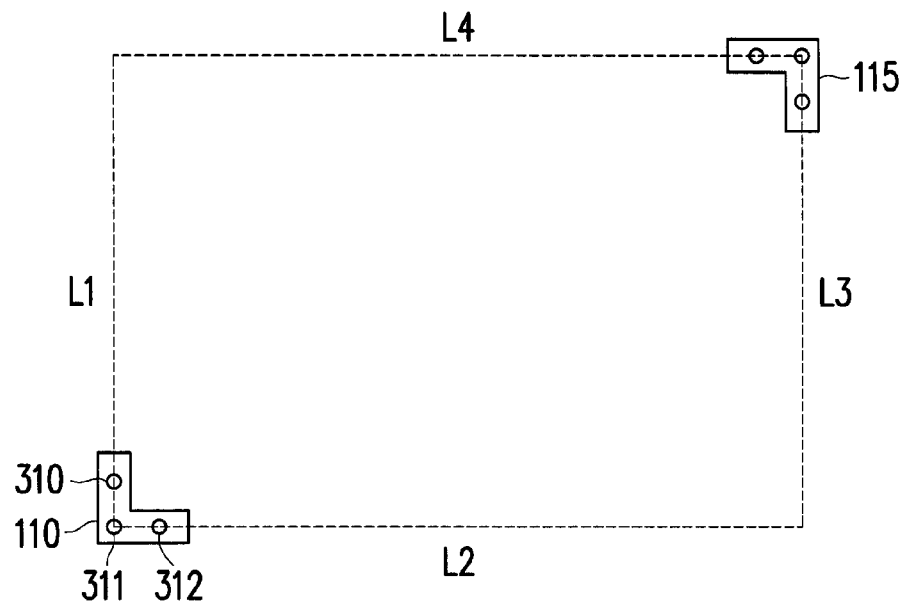
FIG. 3 is an example of a region indicator according to an embodiment of the invention.
Figure 6:
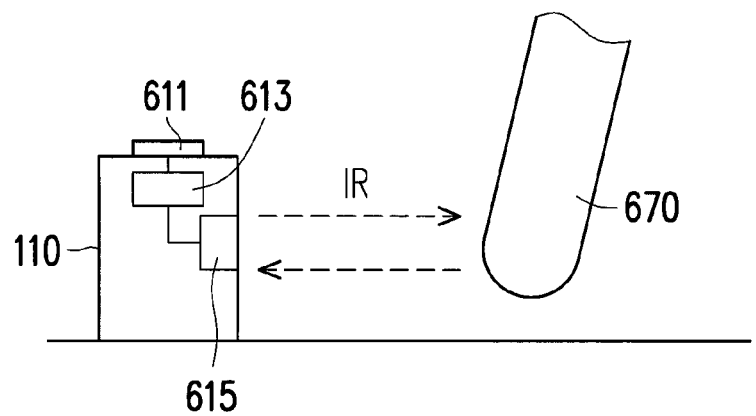
FIG. 6 is an example of a touch sensor in a region indicator according to an embodiment of the invention.

For illustrative purposes, the region indicators 110 and 115 will be illustrated in the FIGS. 3 and 6, and the descriptions of the region indicators 110 and 115 and the devices in the region indicators 110 and 115 will be provided hereinafter. FIG. 3 is an example illustrating the region indicators 110 and 115 according to an embodiment of the invention. FIG. 6 is an example illustrating the touch sensor in the region indicators 110 and 115 according to an embodiment of the invention. With reference to FIG. 1, FIG. 3, and FIG. 6, in the present embodiment, each of the region indicators 110 and 115 includes indication units 310 to 312 and 611 and a touch sensor 615, wherein the indication units 310 to 312 and 611 are used to mark the touch surface. For example, the indication units 310 to 312 and 611 can be light source units which can provide visible light, such as light emitting diodes (LED), incandescent lamps, or fluorescent lamps. The indication units 310 to 312 and 611 may also be the light source units which can provide invisible light, such as infrared ray (IR) emitters, X-ray emitters, or any indication units 310 to 312 and 611 which can present various types of lights or images. The region indicators 110 and 115 can present various light (e.g., with different brightness, colors, and so on) or images by means of the indication units 310 to 312 and 611. The geometric structure surrounded by the indication units 310 to 312 and 611 can act as the contact surface, and the coverage of the contact surface may be changed together with its position and angle, which will be described in the following embodiment.

The touch sensor 615 may be an infrared ray (IR) blocking sensor, an image capturing apparatus, a proximity sensor, or any other sensor which can detect that the operating object touches the touch surface. In an embodiment, each of the region indicators 110 and 115 further includes a central processing unit (CPU) or a microprocessor which is programmable to have general or specific purposes, such as a digital signal processor (DSP), a programmable controller, an application specific integrated circuit (ASIC), any other similar device, or a combination thereof, so as to handle all work of the region indicators 110 and 115 in the embodiment.

Figure 4:
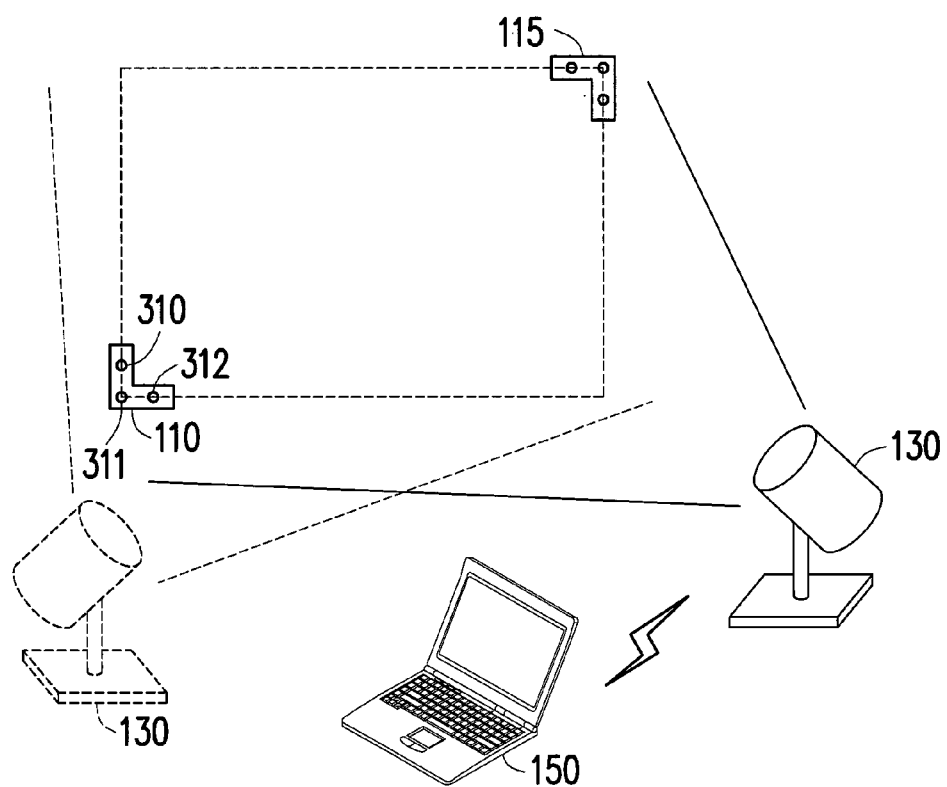
FIG. 4 is an example of a region indicator and an image capturing apparatus according to an embodiment of the invention.

The image capturing apparatus 130 is illustrated in FIG. 4 and will be described hereinafter. FIG. 4 is an example illustrating the region indicators 110 and 115 and the image capturing apparatus 130 according to an embodiment of the invention. As shown in FIG. 1, FIG. 3 and FIG. 4, the image capturing apparatus 130 can be an image capturing apparatus 130 equipped with a photo-sensitive cell, such as a charge-coupled device (CCD), a complementary metal-oxide-semiconductor (CMOS), and so on. In the present embodiment, the image capturing apparatus 130 captures images including the region indicators 110 and 115. In particular, the region indicators 110 and 115 can mark the range of the touch surface, and thus the image capturing apparatus 130 is disposed on the touch surface including the region indicators 110 and 115, so that the images corresponding to the touch operations on the touch surface by the operating object (e.g., a finger, a stylus, and so on) can be captured. In other words, the angle of capturing images by the image capturing apparatus 130 should, to the best of one's ability, be determined without blocking the touch surface (captured by the image capturing apparatus 130) by the operating object.

The processing apparatus 150 can be equipped with a CPU or a microprocessor which is programmable to have general or specific purposes, such as a DSP, a programmable controller, an ASIC, any other similar device, or a combination thereof. In the present embodiment, the processing apparatus 150 is connected to the image capturing apparatus 130 to receive and analyze images captured by the image capturing apparatus 130.

It should be mentioned that the image capturing apparatus 130 in the present embodiment is disposed on the processing apparatus 150 (e.g., embedded in or externally placed on the processing apparatus 150), and the processing apparatus 150 can further control the image capturing apparatus 130. In another embodiment, the image capturing apparatus 130 can be connected to the processing apparatus 150, so as to transmit data to and communicate with the processing apparatus 150 in a wired manner, such as a Universal Serial Bus (USB), IEEE1394, and an internet cable (such as RJ-45, optical fibers and so on), or in a wireless manner, such as through wide fidelity (WiFi), Bluetooth, near-field communication (NFC), and so on to. However, the way to connect the image capturing apparatuses 130 to the processing apparatus 150 is not limited to those provided in the embodiment of the invention.

Figure 2:
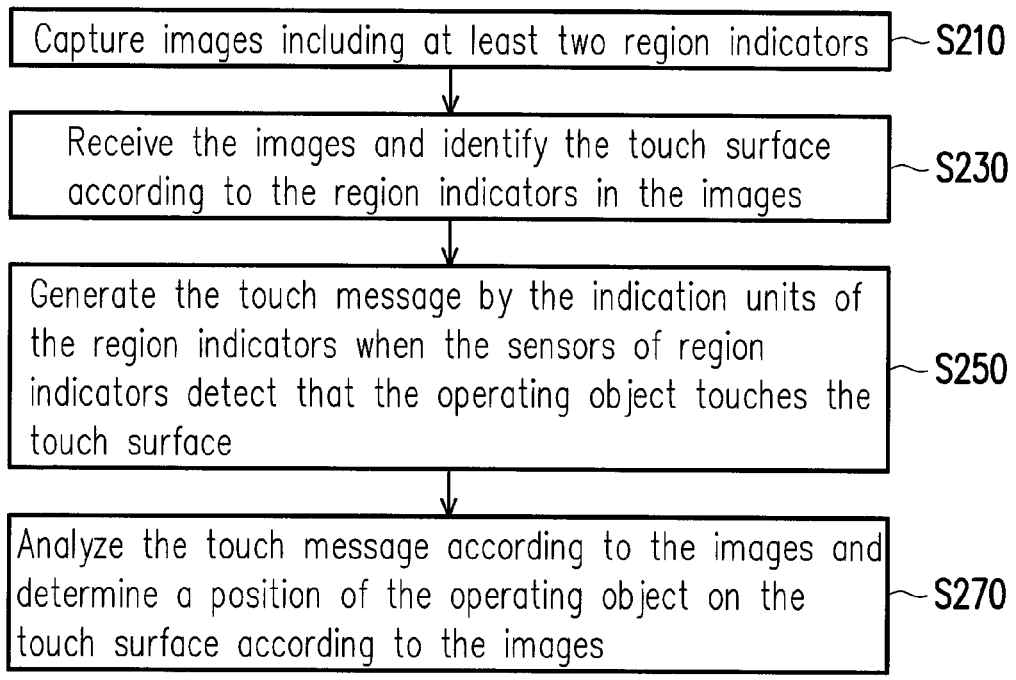
FIG. 2 is a flow chart illustrating a control method of an image based touch apparatus according to an embodiment of the invention.

FIG. 2 is a flow chart illustrating a control method of the image based touch apparatus according to an embodiment of the invention. As shown in FIG. 2, the control method in the present embodiment is suitable for the image based touch apparatus 100 depicted in FIG. 1. In the following paragraphs, the control method in the present embodiment will be illustrated with reference to each module and device in the image based touch apparatus 100. Each step in the control method can be modified according to actual requirements and is not limited to those described herein.

In step S210, the image capturing apparatus 130 captures images including the region indicators 110 and 115, and the region indicators 110 and 115 can mark the corners of the touch surface. Specifically, the embodiment in the invention enables the user to arrange the position of the region indicators 110 and 115 at will (i.e., place the position of the region indicators on a plane of a wall, a whiteboard, a blackboard, and so on). For example, the region indicators 110 and 115 are disposed on the diagonal corner of the wall or the whiteboard and so forth, while the range of the touch surface varies according to the arrangement by the user.

As shown in FIG. 3, for example, the region indicator 110 includes three indication units 310, 311, and 312 (such as light-emitting diode, LED), and these three indication units 310, 311, and 312 form a right-angled triangle, wherein the extensions of two line segments L1 and L2 which constitute the right angle of the triangle and the extensions of two line segments L3 and L4 which constitute the right angle of the other triangle formed by the other region indicator 115 can surround and define the touch surface. That is, the region located in the quadrangle and surrounded by the line segments L1, L2, L3, and L4 can be defined as the touch surface. In other embodiments, the region indicators 110 and 115 can have five or six indication units 310 to 312 and 611, which should not be construed as a limitation to the invention. In addition, the position arrangement of the region indicators 110 and 115 depicted in FIG. 3 is only an example; in other embodiments, the positions of the region indicators 110 and 115 may be arranged in a different manner.

In the present embodiment, the image capturing apparatus 130 is disposed on the touch surface, such that the image capturing apparatus 130 is enabled to capture images including the region indicators 110 and 115. For example, as shown in FIG. 4, the range of the image captured by the image capturing apparatus 130 may cover the touch surface surrounded by the region indicators 110 and 115. However, the position of the image capturing apparatus 130 and the range of the image captured by the image capturing apparatus 130 depicted in FIG. 4 are merely exemplary. In other embodiments, the position of the image capturing apparatus 130 can be arranged in a different manner (such as the image capturing apparatus 130 located on the left side in FIG. 4 and depicted by dashed lines), and the range of the image captured by the image capturing apparatus 130 may also be different from that provided in the present embodiment.

It should be mentioned that the image capturing apparatus 130 can be set up to capture images at the fixed speed, e.g., 30 frames per second (fps), 60 fps, and so on, and the speed of capturing images by the image capturing apparatus 130 may be adjusted by the user according to the embodiment of the invention, which should not be construed as a limitation to the invention.

As shown in FIG. 2 and FIG. 4, in step S230, the processing apparatus 150 receives images and identifies the touch surface according to the region indicator 110 and 115 in the images. For example, the indication units 310 to 312 in the region indicators 110 and 115 are LED. The region indicators 110 and 115 can further include switches for the user to turn on the LED. In other embodiments, the region indicators 110 and 115 can also include sensors to detect if the arrangement determined by the user is completed (e.g., to detect if the region indicators 110 and 115 touch walls). The processing apparatus 150 can now perform certain analyses to identify images based on algorithms, such as principal component analysis (PCA), independent component analysis (ICA), and so on. Thereby, the position information of the lightened indication units 310 to 312 may also be identified. In other embodiments, the region indicators 110 and 115 may control the indication units 310 to 312 to present red light, so that the processing apparatus 150 can identify the position of the red light in the images.

When the processing apparatus 150 identifies the position of the indication units 310 to 312 in the region indicators 110 and 115, the processing apparatus 150 starts identifying the touch surface defined by the region indicators 110 and 115 in the images. For example, as shown in FIG. 2 and FIG. 3, the processing apparatus 150 identifies the touch surface defined by the extensions of the two line segments L1 and L2 which constitute the right angle of the triangle formed by indication units 310, 311, and 312 and the extensions of the two line segments L3 and L4 which constitute the right angle of the triangle formed by another region indicator 115. The processing apparatus 150 records information of the touch surface (such us the position. the range, and so on) and converts the information into a format (e.g., a position table) defined by the processing apparatus 150, so as to process the information in subsequent steps.

Figure 5A:
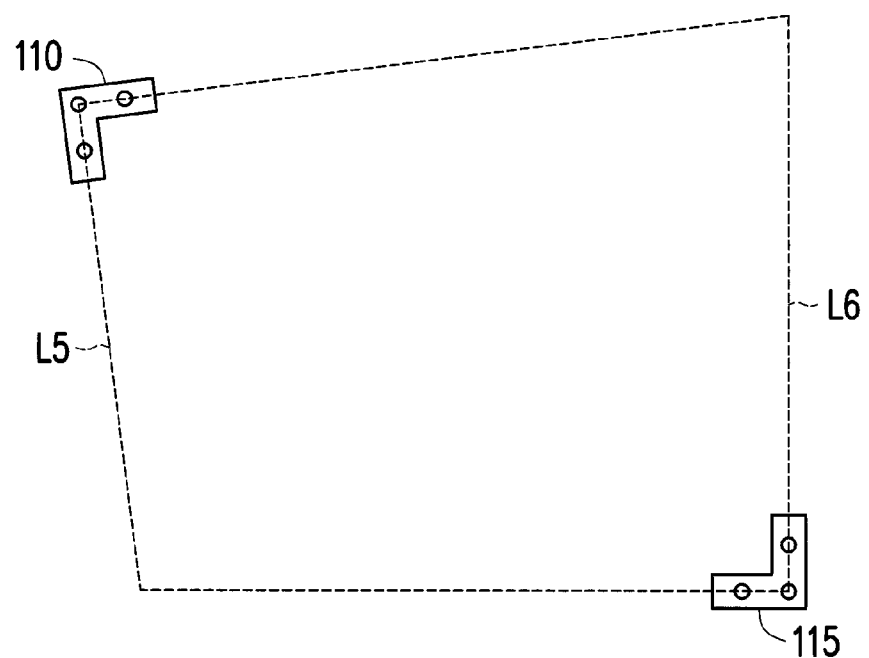
FIG. 5A and FIG. 5B are examples of a touch surface according to an embodiment of the invention.
Figure 5B:
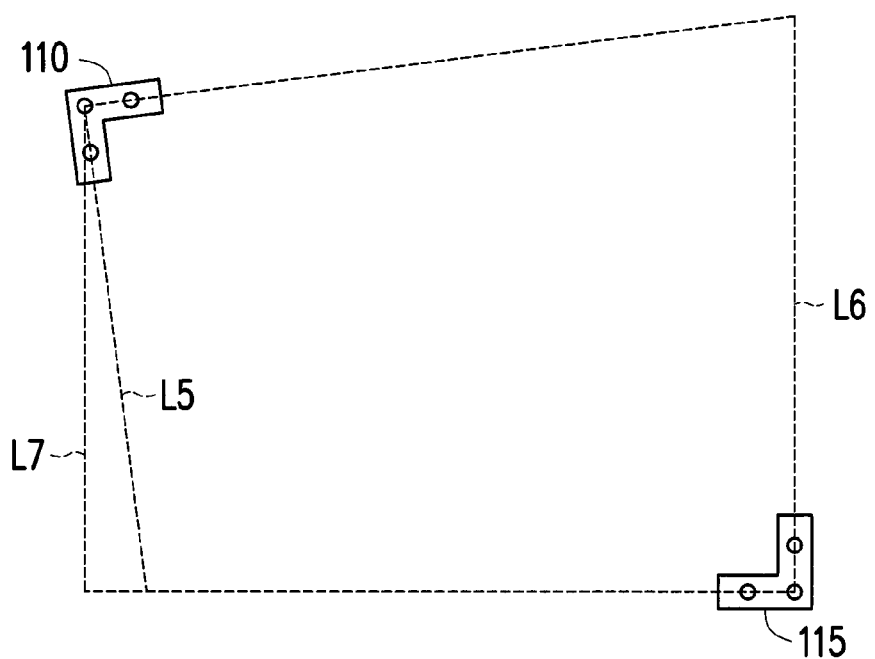

Note that in the present embodiment the processing apparatus 150 further calibrates the range of the touch surface according to the recorded information of the touch surface. For example, FIG. 5A and FIG. 5B are examples of the touch surface according to an embodiment of the invention. In FIG. 5A, the touch surface marked by the region indicators 110 and 115 is quadrangle, and each pair of the opposing sides in the quadrangle is not parallel to each other (for example, the side L5 and the side L6). In FIG. 5B, the processing apparatus 150 selects one set of the two opposing sides (i.e., the sides L5 and L6) in the quadrangle and adjusts the two sides L5 and L6 to be parallel to each other. In FIG. 5B, the processing apparatus 150 adjusts the side L5 to become the side L7, wherein the side L7 is parallel to the side L6; the processing apparatus 150 then assigns the calibration surface (that is, the quadrangle formed by replacing the side L5 with the side L7) to be the touch surface. For example, the information of the calibration surface (such as positions, ranges, and so on) is recorded, and the recorded information is replaced with the pre-stored information of the touch surface. Note that the processing apparatus 150 is capable of setting the extent of calibration. For example, the calibration angle of the side L5 can only be at most 5 degrees to avoid the influence on analyzing the position of the operating object, which will be conducted later on; if the calibration angle exceeds 5 degrees, a notification message (e.g., in form of flash indicator light or red light on the processing apparatus 150) will be displayed to inform the user of replacing the region indicators 110 and 115.

It is to be mentioned that the processing apparatus 150 receives images captured by the image capturing apparatus 130 in step S210, and the processing apparatus 150 can receive all images according to the speed (e.g., 30 fps, 40 fps, and so on) of capturing the images of the image capturing apparatus 130 or receive parts of the images according to specific sampling frequencies (e.g., 3 images per second, 10 images per second, and so on).

As shown in FIG. 2, FIG. 4, and FIG. 6, in step S250, when the touch sensors 615 in the region indicators 110 and 115 detect that the operating object touches the touch surface, the indication units 310 to 312 and 611 of the region indicators 110 and 115 generate touch messages. As exemplarily shown in FIG. 6, the region indicator 110 includes the indication unit 611, the processor 613, and the touch sensor 615 in form of the IR blocking sensor. In the present embodiment, the touch sensor 615 emits and spreads infrared rays on the touch surface, and the touch sensor 615 determines if the operating object 670 truncates signals spread over the touch surface (e.g., infrared rays). When the operating object 670 approaches/touches the touch surface by a predefined distance above the touch surface (such as 5 millimeters, 3 millimeters, and so on), the operating object 670 blocks infrared rays emitted by the touch sensor 615, and the blocked infrared rays are reflected back to the touch sensor 615. After the touch sensor 615 receives the reflected infrared rays, the processor 613 can control the indication unit 611 to generate the touch message according to the identification result. For example, the indication unit 611 can be an LED; the processor 613 controls the indication unit 611 to blink at high frequencies, to stop emitting light from the indication unit 611, to alternately blink the light with different wavelengths, and so on. Various expressions of lights emitted by the indication unit 611 are applicable to the invention as long as the emitted lights are different from the displayed frame, and the invention is not limited to those described herein.

Furthermore, since there is no need to connect the region indicators 110 and 115 and the processing apparatus 150 or connect the region indicators 110 and 115 and the image capturing apparatus 130, the touch message generated in step S250 is employed to inform the processing apparatus 150, so that the processing apparatus 150 is able to learn that the operating object is operated on the touch surface. Accordingly, the touch messages mentioned in the embodiments of the invention are not limited to that depicted in FIG. 6 and can be in form of darker light, visible light with different colors, or invisible light including the infrared light with the wavelength of 770 nanometers or more or the ultraviolet light with the wavelength of 440 nanometers or less.

In step S270, the processing apparatus 150 analyzes the touch message generated by the region indicators 110 and 115 according to the images and identifies the position of the operating object on the touch surface according to the images. Specifically, the processing apparatus 150 determines whether the images captured by the image capturing apparatus 130 include the touch message according to the above-mentioned image identification algorithm; once the touch message appears in the images, the processing unit 150 starts analyzing the position of the operation of the operating object in the images.

Figure 7:
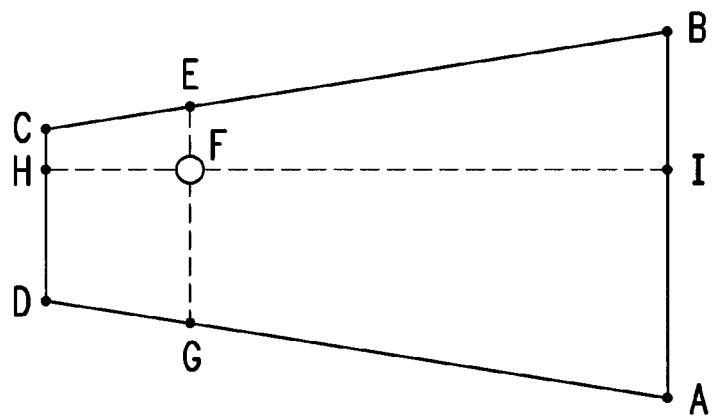
FIG. 7 is an example of identifying a position according to an embodiment of the invention.

For example, FIG. 7 is an example of identifying the position according to an embodiment of the invention. As shown in FIG. 7, the region indicators 110 and 115 can form a quadrangle surrounded by links between points A, B, C, and D, wherein the quadrangle has been calibrated by the processing apparatus 150, such that the line segments AB and CD are in parallel. If the operating object in the images is located at the point F, the processing apparatus 150 produces the line segment EG, and the line segment EG passes through the point F and is parallel to the line segments AB and CD. If the touch surface has the resolution of 1920×1080, the processing apparatus 150 can calculate the Y-coordinate of the operating object by means of the following formula (1):

$$(1080/\overline{EG})*\overline{EF} \tag{1}$$

wherein $\overline{EG}$ and $\overline{EF}$ are lengths of the line segments EG and EF. Besides, the processing apparatus 150 produces the line segment HI, so that the line segment HI passes through the point F and meets the following formula (2):

$$\overline{EF}:\overline{FG}=\overline{CH}:\overline{HD}=\overline{BI}:\overline{IA} \tag{2}$$

wherein $\overline{FG}$ represents the length of the line segment FG, and the rest may be deduced by analogy and will not be further described hereinafter. The processing apparatus 150 can calculate the corresponding X-coordinate of the operating object according to the following formula (3):

$$(1080/\overline{HI})*\overline{HF} \tag{3}$$

wherein HI and HF are lengths of the line segments EG and EF.

It should be mentioned that the processing apparatus 150 in another embodiment of the invention can directly identify the position of the operating object on the touch surface after identifying the touch surface in step S230, and it is no need to wait for the analysis result of the touch message.

In an embodiment of the invention, the processing apparatus 150 can be a computer system (such as the laptop computer in FIG. 4, a desktop computer, a smart phone, a tablet computer, and so on). In another embodiment, the processing apparatus 150 may be further connected to the computer system through cable connection by means of the USB, the IEEE 1394 bus, a cable line, and so on, or the processing apparatus 150 may be connected to the computer system through in a wireless manner, e.g., through WiFi, Bluetooth, NFC, etc. The processing apparatus 150 can send the analyzed coordinates to the computer system, such that the users are allowed to touch the touch surface with their fingers or the stylus to operate the computer system.

In addition, when the touch sensor 615 does not detect that the operating object touches the touch surface, the indication units 310 to 312 and 611 of the region indicators 110 and 115 generate the non-touch messages. The processing unit 150 analyzes the non-touch messages according to the images and stops identifying the position of the operating object on the touch surface according to the images. In the present embodiment, the non-touch messages serve to inform the processing apparatus 150, so that the processing apparatus 150 is able to learn that the operating object is not operated on the touch surface. The description of the non-touch messages may be deduced from the above description of the touch messages and is not limited thereto. Nevertheless, the touch messages and the non-touch messages in the embodiment should be different types of messages (e.g., red light and blue light, light with different intensities, and so on). The processing apparatus 150 also needs to stop sending the analyzed coordinates to the computer system.

In an embodiment of the invention, the processing apparatus 150 is capable of analyzing the position of the operating object and can further allow the users to utilize styluses and fingers to make gestures on the touch surface, and the gestures include a clicking action, a sliding action, a dragging action, a double-clicking action, a press-and-hold action, and so forth. The multi-finger functions can also be performed. The processing apparatus 150 analyzes the gestures and the touch positions of the fingers based on the image-identification algorithm.

It should be mentioned that the image based touch apparatus 100 in the above embodiment has two region indicators 110 and 115. In other embodiments, the image based touch apparatus 100 can further provide three, four, or other quantities of region indicators, and the number of the region indicators is not limited thereto. In an embodiment of the invention, the region indicators can be arranged in various manner to satisfy the requirements of the users and to form the touch surface of any geometric shape. The processing apparatus 150 can analyze the touch surface marked by the indication units of the region indicators according to the images.

In addition, in the above-mentioned embodiment, the image based touch apparatus 100 has one image capturing apparatus 130 and one processing apparatus 150. In other embodiments, the image based touch apparatus may have different quantities (such as two or three) of image capturing apparatuses 130 and one processing apparatus 150 or different quantities (such as two or three) of image capturing apparatuses 130 and processing apparatuses 150. As a result, the processing apparatus 150 can analyze many sets of images so as to improve the accuracy of the position identification.

In view of the foregoing, according to an embodiment of the invention, users are allowed to place the region indicators 110 and 115 to set the touch surface, and the processing apparatus 150 identifies the size and the position of the touch surface according to the images captured by the image capturing apparatus 130. When the user touches the touch surface with the operating object, the touch message is generated by the region indicators 110 and 115, so as to inform the processing apparatuses 150 of identifying the position of the operating object on the touch surface according to the images. Consequently, the user can quickly adjust the size of the touch region as needed and is allowed to perform touch functions under various circumstances.

It will be apparent to those skilled in the art that various modifications and variations can be made to the structure of the invention without departing from the scope or spirit of the invention. In view of the foregoing, it is intended that the invention cover modifications and variations of this invention provided they fall within the scope of the following claims and their equivalents.

What is claimed is:

1. An image based touch apparatus comprising:
   at least two region indicators, each of the at least two region indicators including a plurality of indication units and a touch sensor, wherein the indication units are configured to mark a touch surface;
   at least one image capturing apparatus capturing at least one image including the at least two region indicators; and
   a processing apparatus connected to the at least one image capturing apparatus to receive the at least one image, wherein the processing apparatus identifies position information of the indication units according to the indication units showed in the at least one image to define the touch surface according to a geometric structure formed by the indication units showed in the at least one image, when the touch sensor detects an operating object touches the touch surface, the indication units of the at least two region indicators generate a touch message, the touch message comprises visible light or invisible light, and the processing apparatus determines whether the touch message is showed in the at least one image and determines a position of the operating object on the touch surface according to the touch surface showed in the at least one image in response to the touch message being showed in the at least one image.

2. The image based touch apparatus according to claim 1, wherein the touch surface is a quadrangle, the processing apparatus selects one set of two corresponding sides of the quadrangle in the identified position information and adjusts the two sides to be parallel to each other, and the adjusted quadrangle forms a calibration surface as the touch surface.

3. The image based touch apparatus according to claim 1, wherein the touch sensor determines whether the operating object truncates signals spread over the touch surface.

4. The image based touch apparatus according to claim 1, wherein each of the at least two region indicators includes three indication units, the three indication units form a right-angled triangle, and extensions of two line segments constituting a right angle of the triangle in one of the at least two region indicators and extensions of two line segments constituting a right angle of a triangle in another of the at least two region indicators surround and define the touch surface.

5. The image based touch apparatus according to claim 1, wherein if the touch sensor does not detect that the operating object touches the touch surface, the indication units of the at least two region indicators generate a non-touch message, and the processing apparatus analyzes the non-touch message according to the at least one image and stops determining the position of the operating object on the touch surface according to the at least one image.

6. A control method of an image based touch apparatus, the method comprising:
    capturing at least one image including at least two region indicators, wherein each of the at least two region indicators comprises a plurality of indication units, and the at least two region indicators are configured to mark a touch surface;
    receiving the at least one image and identifying position information of the indication units according to the indication units showed in the at least one image to define the touch surface according to a geometric structure formed by the indication units showed in the at least one image;
    when the at least two region indicators detect an operating object touches the touch surface, generating a touch message by the at least two region indicators, wherein the touch message comprises visible light or invisible light;
    determining whether the touch message is showed in the at least one image; and
    determining a position of the operating object on the touch surface according to the touch surface showed in the at least one image in response to the touch message being showed in the at least one image.

7. The control method of the image based touch apparatus according to claim 6, wherein the touch surface is a quadrangle, and the step of identifying position information according to the at least two region indicators in the at least one image includes:
    selecting one set of two corresponding sides of the quadrangle and adjusting the two sides to be parallel to each other; and
    forming a calibration surface as the touch surface by the adjusted quadrangle.

8. The control method of the image based touch apparatus according to claim 6, wherein when the at least two region indicators detect the operating object touches the touch surface, the step of generating the touch message by the at least two region indicators includes:
    determining whether the operating object truncates signals spread over the touch surface.

9. The control method of the image based touch apparatus according to claim 6, wherein each of the at least two region indicators includes three indication units, the three indication units form a right-angled triangle, and the step of identifying position information according to the at least two region indicators in the at least one image includes:
    identifying extensions of two line segments constituting a right angle of the triangle in one of the at least two region indicators and extensions of two line segments constituting a right angle of a triangle in another of the at least two region indicators to surround and define the touch surface.

10. The control method of the image based touch apparatus according to claim 6, wherein after the steps of determining whether the touch message is showed in the at least one image and determining the position of the operating object on the touch surface, the control method further includes:
    if is not detected that the operating object touches the touch surface, generating a non-touch message by the at least two region indicators; and
    analyzing the non-touch message according to the at least one image and stopping determining the position of the operating object on the touch surface according to the at least one image.

* * * * *